1

3,028,422
PROCESS FOR THE PRODUCTION OF ACIDS OF THE VITAMIN A SERIES
Karl Eiter, Koln-Stammheim, and Ernst Truscheit, Leverkusen, Germany, assignors to Farbenfabriken Bayer Aktiengesellschaft, Leverkusen, Germany, a corporation of Germany
No Drawing. Filed Apr. 22, 1959, Ser. No. 807,989
Claims priority, application Germany Apr. 25, 1958
8 Claims. (Cl. 260—514)

This invention relates to a process for the production of acids of the vitamin A series and is more particularly concerned with the preparation of these compounds by reacting γ-halo-β-alkylcrotonic acid esters with aldehydes from the vitamin A series.

It is known that γ-bromo-β-alkoxycrotonic acid esters can be reacted with aldehydes, such for example as benzaldehyde or cinnamaldehyde, by the Reformatsky process and in accordance with the following equation to give lactones of the general Formula I.

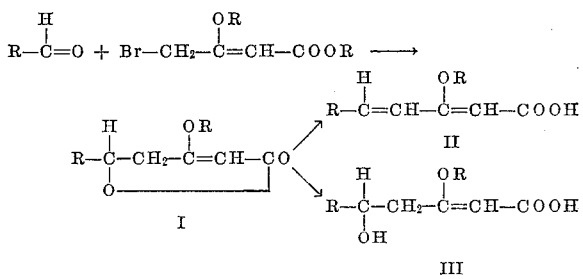

It is also known that the lactones thus obtained can be converted into the acids of Formula II by boiling with caustic alkali solution (see D. G. F. R. Kostermans Rec. Trav. Chim. Pays-Bas, vol. 70 (1951) page 79, E. B. Reid et al., Journal of the American Chemical Society, vol. 73 (1951) page 1054). If the aldehyde used for the reaction is cyclopentene aldehyde then the hydroxy acid of the Formula III is obtained from the lactone by saponification (F. Kögl et al., Rec. Trav. Chim. Pays-Bas, vol 69 (1950) page 729).

It is an object of the present invention to provide a process for the production of acids of the vitamin A series another object of the invention is to prepare these acids of the vitamin A series by using aldehydes of the vitamin A series as initial materials. A still further object of the present invention is to provide a process for the production of acids of the vitamin A series by reacting aldehydes of the vitamin A series upon β-alkylated γ-halo-crotonic acid esters. Further objects and embodiments of the invention will be referred to in greater detail in the following further description.

It has now been found that γ-halo-β-methyl-substituted crotonic acid esters can be reacted with aldehydes of the vitamin A series under gentle conditions of the Reformatsky synthesis to give lactones and these can be converted by treating with nucleophilic agents in an anhydrous medium to form the isomeric γ, δ-unsaturated acids.

2

In the case of β-cyclocitral, the process can be represented by the following reaction diagram:

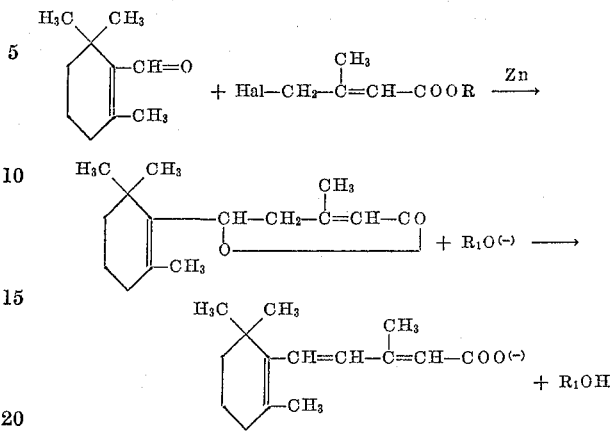

In the foregoing, R represents a low alkyl radical, $R_1$ is likewise an alkyl radical, which however in certain cases is different from R, and Hal represents a bromine or iodine atom.

Examples of γ-halo-β-methylcrotonic acid esters suitable for the process of the present invention are methyl γ-bromo-β-methyl-crotonate and isopropyl γ-iodo-β-methyl-crotonate.

Suitable aldehydes of the vitamin A series are for example α- or β-cyclocitrals and β-ionylidene acetaldehyde.

The reaction can be carried out under the known conditions of the Reformatsky synthesis. The two starting substances, which if necessary can be dissolved in an inert solvent, react with one another in the presence of zinc. It is advisable to use the halogen containing ester in excess, advantageously about 1.2 to 1.5 mols per mol of aldehyde. The zinc is added in equivalent quantities, based on the halogen containing ester. The solvents used are benzene, toluene or more advantageously polar solvents such as tetrahydrofuran or diethyl ether and their mixtures.

The reaction takes place under gentle reaction conditions, for example at temperatures of from about 40 to 70° C., in a comparatively highly diluted form and with only brief heating to boiling point after completing the main reaction. The reaction mixture is decomposed with weakly acid agents, such as aqueous ammonium chloride solution, dilute aqueous sulfuric acid, hydrochloric acid, phosphoric acid or acetic acid. Under these conditions, the lactone is obtained in very good yields. From this lactone, the unsaturated acid can be obtained in an anhydrous medium as salt of the unsaturated acid by treating with nucleophilic agents such as alcoholates or alkali metal amides. Sodium ethoxide in ethanol, potassium tertiary butylate, sodium amide in anhydrous ether are suitable nucleophilic agents. The lactone can be split off at, below or above room temperature. The alcoholate or the alkali metal amide is added in substantially equimolecular quantities or in a slight excess.

It was surprising that the process of the present invention leads to compounds of the vitamin A series and not to the retro-vitamin A series, since it was known from Rec. Trav. Chim. Pays-Bas, vol. 71 (1952) pages 908 and 909, that, with γ-bromo-β-methylcrotonic acid ethyl ester, an unsaturated compound of the retro-vitamin A series is normally formed using the Reformatsky reaction of β-ionylidene acetaldehyde.

The products obtained by the process of the present invention are valuable intermediates for the synthesis of vitamin A and its biologically active derivatives. For example, it is possible to prepare directly the 2-cis-vitamin A acid, which can be transposed in known manner into the all-trans-vitamin A acid.

The invention is further illustrated by the following examples without in any way limiting it thereto.

*Example 1*

δ-Lactone of 5-(2'6',6'-trimethylcyclohexenyl-1')-5-hydroxy-3-methyl-pent-2-enoic acid.—In a three-necked flask fitted with a stirrer, low-temperature cooler, dropping funnel, thermometer and inlet pipe for nitrogen, about ⅕ of the mixture of 60.8 grams of β-cyclocitral, 320 ml. of absolute tetrahydrofuran and 80 grams of methyl γ-bromo-β-methyl-crotonate are added to 30 grams of powdered zinc. The mixture is initially heated gently in a nitrogen atmosphere while stirring until the violent reaction commences. The remainder of the reaction mixture described above is now run in from the dropping funnel at such a rate that the contents of the flask boil vigorously without external heating. When all the mixture has been added and the reaction has subsided, it is heated for another 10 to 15 minutes at boiling point and then the contents of the flask are cooled to 0° C. when cold, saturated aqueous ammonium chloride solution is run in while stirring strongly, and the contents of the flask are transferred to a separating funnel and extracted several times with ether. The ethereal phase is dried over sodium sulfate. The solvent and about 6.5 grams of unreacted β-cyclocitral are distilled off under reduced pressure. The evaporation residue is dissolved in 2 to 3 times the volume of low-boiling point petroleum ether and the solution cooled to a low temperature. The resulting crystal mass is quickly filtered off by suction, washed with a little cold petroleum ether and in this way there are obtained 70.5 grams of colorless δ-lactone of 5-(2',6',6'-trimethylcyclohexenyl-1')-5-hydroxy-3-methyl-pent-2-enoic acid which melts at 81° C. after being recrystallized from ether and petroleum ether. Yield: 84% of the theoretical (calculated on the reacted β-cyclocitral). The ultra-violet absorption maximum is at 217 mμ (log ε=4.1).

*Analysis.*—Molecular weight, 234.3. $C_{15}H_{22}O_2$.—Calculated: C=76.88%; H, 9.47%; O=13.66%. Found: C=77.06%; H, 9.40%; O=13.90%.

(b) 2-cis - 5-(2',6',6' - trimethylcyclohexenyl - 1')-3-methyl-penta - 2,4 - dienoic acid (2-cis-β-ionylidene acetic acid).—The solution of 30 grams of the lactone obtained in Example 1(a) in 180 ml. of absolute ethanol is heated for 1 hour under reflux on a boiling water bath with a solution of 7.5 grams of sodium in 180 ml. of absolute ethanol. The major part of the ethanol is evaporated under reduced pressure and the residue is dissolved in water. The 2-cis-β-ionylidene acetic acid is precipitated by adding 10% phosphoric acid. Yield: about 30 grams (almost quantitative), M.P. 103 to 104° C. (from ether+petroleum ether).

*Analysis.*—Molecular weight, 234.3. $C_{15}H_{22}O_2$.—Calculated: C, 76.88%; H, 9.47%; O, 13.66%; act. H, 0.43%. Found: C, 76.94%; H, 9.61%; O, 13.90%; act. H, 0.46%.

*Example 2*

(a) δ-Lactone of 9-(2',6',6'-trimethylcyclohexenyl-1')-3,7-dimethyl-5-hydroxy-nona - 2,6,8 - trienoic acid. — 6.8 grams of powdered zinc (preferably initially corroded with hydrochloric acid, successively washed with water, ethanol, acetone and absolute ether and dried at 12 mm. Hg. and 80 to 90° C.) are placed in a three-necked flask equipped with a stirrer, thermometer, reflux condenser, dropping funnel and supply pipe for nitrogen and initially about ⅕ of the mixture of 15.7 grams of γ-bromo-β-methyl-crotonic acid methyl ester, 11.5 grams of β-ionylidene acetaldehyde (analytically pure) and 85 ml. of absolute tetrahydrofuran are added thereto. While stirring, the mixture is heated in a nitrogen atmosphere until the reaction starts; the remainder of the mixture is then gradually run in from the dropping funnel while heating slightly, so that the contents of the flask boil gently. When all has been added and the powdered zinc is practically consumed, the reaction mixture is stirred for another 10 to 15 minutes without external heating and then decomposed with saturated aqueous ammonium chloride solution at 0° C. The reaction product is extracted with ether. After drying the combined ether extracts over sodium sulfate, the solvent is evaporated under reduced pressure. About 16 grams of a cognac-colored oil residue are obtained, from which the δ-lactone of the 9-(2',6',6'-trimethylcyclohexenyl-1')-3,7-dimethyl-5-hydroxy-nona-2,6,8-trienoic acid is obtained by chromatographic purification on an aluminum oxide column (standardized according to Brockmann) as a slightly yellow thickly liquid substance with a B.P.$_{0.001}$ of 130 to 140° C. (air bath temperature). The ultra-violet absorption maxima are at 273 mμ (ε=10,900) and 223 mμ (ε=16,800). The infra-red absorption spectrum shows a carbonyl band at 1720 cm.$^{-1}$ and also the absorption at 963 cm.$^{-1}$ which is characteristic for the symmetrically di-substituted

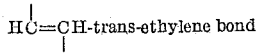

*Analysis.*—Molecular weight, 300.44. $C_{20}H_{38}O_2$.—Calculated: C, 79.95%; H, 9.40%. Found: C, 79.59%; H, 9.36%.

(b) 2-cis-vitamine A acid (neovitamin A acid).—The solution of 1.5 grams of the δ-lactone of 9-(2',6',6'-trimethylcyclohexenyl-1') - 3,7-dimethyl-5-hydroxy-nona-2,6,8-trienoic acid in 20 ml. of absolute ethanol is left standing at room temperature for 1 to 2 hours with the solution of 140 mg. of metallic sodium in 20 ml. of absolute ethanol. The major part of the ethanol is then evaporated under reduced pressure, the residue is taken up in water and the solution extracted once with ether. The aqueous phase is acidified in the cold with dilute phosphoric acid and the 2-cis-vitamin A acid (neovitamin A acid) occurring in crystalline form is extracted with ether. After washing the ether phase with sodium chloride solution, drying over sodium sulfate and evaporating the ether, there are obtained about 1.4 grams of 2-cis-vitamin A acid with a M.P. of 177 to 178° C., $\lambda_{max}$=351 mμ (ε=40,000). These data agree with those known in the literature (for example C. D. Robeson et al., Journal of the American Chemical Society, vol. 77 (1955), page 4118). The infrared absorption spectrum shows a carbonyl band at 1670 cm.$^{-1}$ and also the absorption at 968 cm.$^{-1}$ which is characteristic for the symmetrically di-substituted

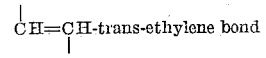

*Analysis.*—Molecular weight, 300.44. $C_{20}H_{28}O_2$.—Calculated: C, 79.95%; H, 9.40%. Found: C, 79.56%; H, 9.22%.

What we claim is:

1. Process for the production of acids of the vitamin A series which comprises heating at temperatures between 40 and 70° C. a compound selected from the group consisting of γ-bromo-β-methylcrotonic acid esters and γ-iodo-β-methylcrotonic acid esters, the ester component having up to three carbon atoms, with an aldehyde selected from the group consisting of α- and β-cyclocitral and β-ionylidene acetaldehyde in the presence of zinc and an inert organic solvent selected from the group consisting of tetrahydrofuran, benzene, toluene, diethyl ether and mixtures thereof, adding a weakly acidic aqueous solution of a member selected from the group consisting of ammonium chloride, hydrochloric acid, sulfuric acid, phosphoric acid and acetic acid to the cooled reaction mixture, isolating the lactone thereby formed by extraction with an inert organic solvent, and treating the isolated lactone with a nucleophilic agent selected from the group consisting of alkoxides having up to 4 carbon atoms and alkali metal amides in an anhydrous medium selected from the group consisting of anhydrous alcohols having up to 4 carbon atoms and anhydrous ether to thereby form the isomeric γ,δ-unsaturated acid.

2. The process according to claim 1, in which said γ-halo-β-methyl crotonic acid ester is reacted with said aldehyde in the molar ratio ester to aldehyde of 1.2 to 1.5.

3. Process as claimed in claim 1, wherein the reaction of γ-halo-β-methylcrotonic acid ester with said aldehyde in the presence of zinc powder is carried out at temperatures in the region of approximately 40 to 70° C.

4. Process according to claim 3, in which said reaction of said γ-halo-β-methyl crotonic acid ester with said aldehyde in the presence of zinc powder is initially carried out under nitrogen.

5. Process according to claim 3, in which said mixture from the reaction of said γ-halo-β-methyl crotonic acid ester with said aldehyde is treated with said weakly acidic aqueous solution at temperature of about 0° C.

6. The process according to claim 3, in which the solvent for the reaction between said ester and said aldehyde is tetrahydrofuran.

7. The process according to claim 3, in which the solvent for the reaction between said ester and said aldehyde is diethyl ether.

8. Process for the production of neovitamin A acid which comprises gently refluxing at 40°–70° C. methyl γ-bromo-β-methyl crotonate with β-ionylidene-acetaldehyde in the presence of zinc powder and tetrahydrofuran, adding an aqueous solution of ammonium chloride to the cooled reaction mixture at about 0° C., isolating the lactone of the 9-(2′,6′,6′-trimethylcyclohexenyl-1′) - 3,7-dimethyl-5-hydroxy-nona-2,6,8-trienoic acid by extraction with an inert organic solvent and treating the lactone thus obtained with sodium ethylate as nucleophilic agent in anhydrous ether whereby the isomeric neovitamin A acid is formed.

References Cited in the file of this patent

Huisman et al.: "Rec. Trav. Chim. Pays-Bas.," vol. 71 (1952), pages 899–919.